United States Patent [19]
Hunchar et al.

[11] Patent Number: 5,713,209
[45] Date of Patent: Feb. 3, 1998

[54] TWIN SCREW EXTRUDER FOR BATCH FREEZING

[75] Inventors: Dennis A. Hunchar, Maple Grove; Terry G. Reishus, Eagan; Bernhard Van Lengerich, Plymouth, all of Minn.; Jose Tadeo V. de Castro, Newton, Mass.; Kenneth A. Focht; Chaitanya Kanojia, both of Brookline, Mass.; Clifford S. Lansil, Woburn, Mass.; Christopher T. Zirps, Milton, Mass.

[73] Assignee: General Mills, Inc., Minneapolis, Minn.

[21] Appl. No.: 736,179

[22] Filed: Oct. 24, 1996

[51] Int. Cl.$^6$ .................................................. A23G 9/12
[52] U.S. Cl. .................. 62/68; 62/343; 366/85; 366/301
[58] Field of Search .................... 62/68, 342, 343; 366/85, 301

[56] References Cited

U.S. PATENT DOCUMENTS

| | | |
|---|---|---|
| 1,733,740 | 10/1929 | Vogt. |
| 2,268,905 | 1/1942 | Schaub et al. ............ 62/342 |
| 2,415,585 | 2/1947 | Genova. |
| 2,594,442 | 4/1952 | Irwin. |
| 2,713,253 | 7/1955 | Chandler. |
| 3,188,825 | 6/1965 | Van Olphen. |
| 3,470,706 | 10/1969 | Mitchell et al. |
| 3,726,102 | 4/1973 | Parks. |
| 3,780,536 | 12/1973 | Fishman et al. |
| 3,803,870 | 4/1974 | Conz. |
| 3,817,496 | 6/1974 | Kratochvil et al. |
| 3,883,122 | 5/1975 | Werner. |
| 3,954,126 | 5/1976 | Piana. |
| 4,034,967 | 7/1977 | Gustairs. |
| 4,052,180 | 10/1977 | Erickson. |
| 4,201,558 | 5/1980 | Schwitters et al. |

(List continued on next page.)

FOREIGN PATENT DOCUMENTS

| | | |
|---|---|---|
| 2163284 | 5/1996 | Canada. |
| 3918268 | 7/1990 | Germany. |
| 3905946 | 8/1990 | Germany. |

OTHER PUBLICATIONS

Kanzaki, M., Japanese Application No. 64–163228, Feb. 2, 1991, "Continuous Production of Whipped Food Product and Apparatus Therefor" (Abst. 1991).

Osada, M., Japanese Application No. 60–184781, Mar. 10, 1987, "Production of Edible Dough Using Twin–Screw Extruder and Device" (Abst. 1987).

*Primary Examiner*—William E. Tapolcai
*Attorney, Agent, or Firm*—L. MeRoy Lillehaugen; John A. O'Toole; Alan D. Kamrath

[57] ABSTRACT

An apparatus (10) for at least partially freezing a food product which is at least partly liquid in a batch mode is disclosed including a double screw extruder (12) including first and second, substantially intermeshing, self-wiping screws (14, 16) rotatably received in a figure 8-shaped barrel (30) with minimal clearance. In the preferred form, the freezing block (20) includes multiple refrigerant channels (36) spaced closely and in the most preferred form spaced approximately 0.32 centimeters from the barrel (30) and from each other. Thus, the refrigeration system can change the barrel surface temperature rapidly and specifically in approximately one second when the food product is introduced into the barrel (30). A ratio between the radius of the flight (40) at the crest (42) to the radius at the root (38) of the screws (14, 16) is in the order of 1.04 to reduce the total amount of product in the barrel (30) at any given time and decreasing the product residence time in the extruder (12). In the most preferred form, the food product is aerated and is supplied in discrete volumes from at least one and preferably from multiple sources (48), with the supply of discrete volumes for individual servings being delayed to substantially prevent intermixing in the extruder (12).

26 Claims, 4 Drawing Sheets

U.S. PATENT DOCUMENTS

| | | |
|---|---|---|
| 4,234,259 | 11/1980 | Wiedmann et al. . |
| 4,412,428 | 11/1983 | Giannella et al. . |
| 4,512,160 | 4/1985 | Mas . |
| 4,522,041 | 6/1985 | Menzel . |
| 4,580,905 | 4/1986 | Schwitters et al. . |
| 4,635,825 | 1/1987 | Tulasne . |
| 4,680,944 | 7/1987 | Menzel . |
| 4,733,607 | 3/1988 | Star et al. . |
| 4,736,600 | 4/1988 | Brown . |
| 4,878,760 | 11/1989 | Newton et al. . |
| 4,910,973 | 3/1990 | Osrow et al. . |
| 4,956,980 | 9/1990 | Carvel . |
| 5,024,066 | 6/1991 | Goavec . |
| 5,030,465 | 7/1991 | Curry et al. . |
| 5,036,673 | 8/1991 | Miller et al. . |
| 5,048,971 | 9/1991 | Wall et al. . |
| 5,149,551 | 9/1992 | Anderson . |
| 5,201,861 | 4/1993 | Menzel . |
| 5,205,129 | 4/1993 | Wright et al. . |
| 5,264,234 | 11/1993 | Windhab et al. . |
| 5,292,030 | 3/1994 | Kateman et al. . |
| 5,345,781 | 9/1994 | Fels et al. . |
| 5,385,464 | 1/1995 | Anderson . |
| 5,419,150 | 5/1995 | Kaiser et al. . |
| 5,433,084 | 7/1995 | Kaiser et al. . |
| 5,433,967 | 7/1995 | Kateman et al. . |
| 5,473,909 | 12/1995 | Kateman et al. . |

TWIN SCREW EXTRUDER FOR BATCH FREEZING

BACKGROUND

The present invention generally relates to at least partially freezing a food product which is at least partly liquid, specifically to at least partially freezing a food product in a batch process, and more specifically to dynamic freezing an aerated food product in a batch process.

To produce aerated frozen products such as frozen ice creams, frozen yogurts, or semi-frozen shakes, it is common to incorporate small air bubbles within the matrix of liquid ingredients before freezing. Incorporating air into the matrix of liquid ingredients is called aeration. It is also necessary to continually disturb or scrape the aerated ingredients at the surface of the heat exchanger while freezing the product. Freezing while disturbing the surface of the heat exchanger is called dynamic freezing. Failure to disturb or scrape the surface will cause a migration of the entrapped air away from the chilled surface and will result in a dramatic loss of air content in the frozen product.

Dynamic freezing of an aerated product can be accomplished in a dynamic freezing reservoir type apparatus described in U.S. Pat. Nos. 3,904,085; 3,954,126, and 4,201,588. Aeration and dynamic freezing is accomplished by these reservoir type apparatus simultaneously through a combination of metering in air and liquid ingredients, of beating the matrix of liquid ingredients and of continuously scraping the inner wall of a cylindrical heat exchanger with an auger which eventually whips air into the matrix of liquid ingredients gradually as the product is being frozen in a dynamic fashion. The cylindrical heat exchanger holds and continuously processes a volume of product equal to a multiple of individual servings. Due to the gradual and continuous nature of the process, control over the amount of air incorporated into the matrix of the liquid ingredients, known as "overrun", is limited.

One disadvantage of the apparatus of the dynamic freezing reservoir type described in these three patents is that the heat transfer rate is relatively low due to the comparatively moderate mass transfer of the product at the chilled surface due to a relatively low ratio of surface area of the inner wall of the heat exchanger versus the volume of the heat exchanger and of the liquid ingredients in the reservoir. Lower heat transfer rates equate to a longer time to freeze the product. During periods of high demand on apparatus of the dynamic freezing reservoir type, the charge of adequately frozen product is frequently exhausted, leaving a large volume of partially frozen product in the reservoir. A recovery time is necessary during which the product is dynamically frozen and during which no servings may be withdrawn. This recovery time is typically on the order of ninety seconds.

A further disadvantage of the apparatus of the dynamic freezing reservoir type is that a relatively large volume of product must remain in the heat exchanger at all times. During periods of slow demand, the product in the heat exchanger of the apparatus of the dynamic freezing reservoir type has the opportunity to degrade in texture and flavor. This results in a significant detectable drop in product quality.

Another disadvantage of the large volume of product in the reservoir in apparatus of the dynamic freezing reservoir type is the necessity to completely remove the contents of the heat exchanger before it is possible to change from one product to another. As it is not practical to empty the contents of the heat exchanger between individual servings, apparatus of the dynamic freezing reservoir type includes separate heat exchangers for each product desired to be dispensed, such as one heat exchanger for chocolate and another heat exchanger for vanilla. Individual servings are then dispensed from one or the other of the heat exchangers or simultaneously from both producing a "swirl."

Still another disadvantage of apparatus of the dynamic freezing reservoir type is the necessity to discard the entire contents of the heat exchanger any time operation is desired to be interrupted such as for cleaning. Specifically, to dispense an individual serving from the heat exchanger, it is necessary to introduce a corresponding volume of the liquid ingredients into the heat exchanger. Thus, when it is desired to clean the apparatus, it is not possible to dispense the contents of the heat exchanger to empty the heat exchanger but rather the contents must be manually removed or forced from inside the heat exchanger such as by the introduction of water or similar cleaning fluid. But in any case, the contents of the heat exchanger must be discarded resulting in an increase in overall material costs for the operator.

An alternate means for producing aerated frozen products is to utilize a two-step process where the liquid ingredients are first aerated in an aeration system and then the aerated liquid ingredients are dynamically frozen in a freezing system. A major advantage of aerating the liquid ingredients prior to dynamic freezing is that aeration can be achieved with more positive control of overrun.

An improved means of achieving aeration is described in U.S. Pat. Nos. 5,292,030; 5,433,967; and 5,473,909. In apparatus disclosed therein, air is incorporated into the matrix of the liquid ingredients by means of the rapid transport of the liquid ingredients through a turbulence tube of specific diameter and length by means of a copious amount of compressed air at a specific pressure which is high, enough to ensure turbulent flow. By selecting appropriate turbulence tube dimensions and air pressures, a predictable overrun can be achieved with more positive control than was possible when using the aeration method of the dynamic freezing reservoir type. A drawback to this method of aeration is that only a small percentage of the compressed air used for aeration gets incorporated into the liquid ingredient matrix and the large percentage of the compressed air which does not get incorporated must be exhausted from the apparatus. Positively, the product does not necessarily come into direct contact with any surfaces that would need to be cleaned, with the exception of the turbulence tube itself which could be formed to be disposable.

An alternate means of achieving aeration is described in U.S. Pat. No. 5,345,781. Aeration may also be accomplished through the use of a high speed shearing mixer which combines air and liquid together while mixing air into the liquid ingredient matrix. There are numerous examples of high speed shearing mixers in industry. While not requiring the exhaust of excess air that the turbulence tube method entails, there would be significant additional sanitation demands due to the direct contact of food product within aeration devices of this type.

Various approaches to providing dynamic freezing of a previously aerated product exist. As an example, U.S. Pat. No. 5,345,781 provides a freezing and transporting twin screw extruder. The threads of the second screw are centered between the threads of the first screw and operation is continuous. Specifically, operation involves he production of a volume of product equal to a multiple of individual servings and would normally be utilized in a large scale industrial environment for continuous operation and not operated in a retail environment where individual servings would be sold such as restaurants, drive-ins, and the like.

Embodiments of apparatus described in U.S. Pat. Nos. 5,292,030; 5,433,967; and 5,473,909 discharge an aerated liquid onto a thermally conductive plate having relative movement to a scraper for scraping the thin film of frozen product from the plate. This approach has special application in batch production. Specifically, only the volume of aerated product corresponding to the desired volume of frozen product to be dispensed is discharged onto the thermally conductive plate so that only a single batch or serving of frozen product is frozen. A batch process refers to the production of only a single serving of product as opposed to the simultaneous production of multiple servings whether dispensed continuously or individually. Additionally, the scraper can be designed and arranged so that substantially all of the frozen product is scraped from the thermally conductive plate leaving minimal frozen product on the thermally conductive plate which will mix with the next discharge of aerated liquid onto the thermally conductive plate. This mixing of product between individual servings is referred to as carryover. The advantage of very minimal product carryover from serving to serving on the thermally conductive plate makes it possible to change from one product to another between individual servings. Further, this thin film type freezing can be accomplished more rapidly than reservoir type freezing. Furthermore, when it is desired to interrupt operation, it is not necessary to discard any product. Apparatus of the thin film freezing type avoids many of the other disadvantages of apparatus of the dynamic freezing reservoir type. However, due to its quiescent nature of being frozen as a thin film and being simply scraped from the thermally conductive plate, the final frozen product has different ice crystal and air cell morphology as well as a higher amount of water in a frozen state and a lower volume of air, resulting in a brittle, less pliable texture.

U.S. Pat. No. 3,803,870 discloses a machine for the instantaneous production of ice cream of one or more flavors in a batch process. In apparatus disclosed therein, a liquid or a combination of liquids is frozen in a freezing chamber provided with a cylindrical screw having its axis inclined to the horizontal. A tank including sweetened wash water is provided for washing the machine at the end of production of each unit batch of ice cream in order to cleanly separate the flavors of one unit batch from the flavors of the batch which follows, if required. It is assumed that such washing would be required whenever the flavor desired to be dispensed is different than the flavor of the proceeding batch due to the inability of a single screw to remove all material from the flights of the screw in operation.

Thus, a need continues to exist for apparatus and methods for at least partially freezing a food product which is at least partly liquid and which have very minimal product carryover from serving to serving thus allowing operation in a batch process and which provide dynamic freezing of an aerated food product with a better control of overrun levels.

SUMMARY

The present invention solves this need and other problems in the field of at least partially freezing a food product which is at least partly liquid by providing, in the preferred form, first and second, substantially intermeshing, self-wiping screws rotatably received in a figure 8-shaped barrel with minimal axial and radial clearance, with the barrel being chilled to freeze the food product at the inner wall of the barrel for being continually scraped therefrom by the first and second screws. In the preferred form, operation is in a batch mode where delivery of discrete volumes of the food product to the twin screws is delayed until after the first and second screws have conveyed the prior delivery of food product sufficiently to prevent intermixing.

It is thus an object of the present invention to provide novel apparatus and methods for at least partially freezing a food product which is at least partly liquid.

It is further an object of the present invention to provide such novel apparatus and methods for at least partially freezing a product in a batch process.

It is further an object of the present invention to provide such novel apparatus and methods for producing a series of individual single servings of at least partially frozen aerated product.

It is further an object of the present invention to provide such novel apparatus and methods for at least partially freezing a properly aerated liquid.

It is further an object of the present invention to provide such novel apparatus and methods ensuring proper overrun in at least partially frozen aerated product.

It is further an object of the present invention to provide such novel apparatus and methods for extruding at least partially frozen aerated product at a rate of up to two ounces per second.

It is further an object of the present invention to provide such novel apparatus and methods for minimizing the amount of product in the freezing chamber at all times to ensure that the individual servings will always be fresh.

It is further an object of the present invention to provide such novel apparatus and methods for at least partially freezing an aerated liquid as rapidly as possible.

It is further an object of the present invention to provide such novel apparatus and methods for at least partially freezing an aerated liquid using the smallest volume freezing chamber possible.

It is further an object of the present invention to provide such novel apparatus and methods for self cleaning the freezing chamber to further reduce the amount of product carried over from one individual serving to the next.

It is further an object of the present invention to provide such novel apparatus and methods for extruding at least partially frozen product through a die that forms the frozen product into an extrudate that can be captured in a cup, edible cone or similar container.

It is further an object of the present invention to provide such novel apparatus and methods for pressurizing the aerated liquid product at the entrance to the freezing chamber to provide for increased pumping efficiency.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the Figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "length", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiments.

DESCRIPTION

Apparatus for at least partially freezing a food product which is at least partly liquid in a batch process according to the preferred teachings of the present invention is shown in the drawings and generally designated 10. In the most preferred form, apparatus 10 has special application for the dynamic freezing of an aerated food product. However, apparatus 10 according to the teachings of the present invention also can be used for at least partially freezing other food products including aerated and nonaerated beverages as well as other non-food products which are at least partly liquid. Generally, apparatus 10 includes a double screw extruder 12 having substantially intermeshing, self-wiping screws 14 and 16 rotatable inside of a housing assembly 18. Screws 14 and 16 can include suitable rotary mechanical seals 19 such as disclosed in U.S. Pat. No. 5,345,781 for sealing the shaft ends of screws 14 and 16 to housing assembly 18 to prevent product from leaking along the shafts of screws 14 and 16.

Assembly 18 generally includes in the preferred form a freezing block 20 having an upstream end 22 and a downstream end 24, an inlet block 26 and an exit plate 28. Inlet block 26 is removably secured to and covers upstream end 22 and exit plate 28 is removably secured to and covers downstream end 24. Assembly 18 includes a barrel or channel 30 of a figure 8-shape of a size and configuration corresponding to intermeshing screws 14 and 16 and specifically providing minimal screw-to-barrel clearance.

Barrel 30 extends from downstream end 24 through block 20 and upstream end 22 and terminates in the interior of inlet block 26. Inlet block 26 includes an entrance port 32 extending from the exterior thereof and terminating and in fluid communication with barrel 30 in the interior thereof. Exit plate 28 includes an exit port 34 extending from the exterior thereof and terminating and in fluid communication with barrel 30 of freezing block 20 and in particular overlying the intermeshing area of co-rotating screws 14 and 16 as in the most preferred form of the present invention. In one preferred form, exit plate 28 functions as a die that forms the product passing through exit port 34 into an extrudate that can be captured in a cup, an edible cone or similar container. In the preferred form, the ratio of the length of barrel 30 from the center of entrance port 32 to the inside surface of exit plate 28 versus the outside diameters of screws 14 and 16 is in the order of 3 and in the preferred form in the range of 1.5 to 6, particularly in the range of 2 to 4 and in the most preferred form in the range of 2.5 to 3.5.

Multiple refrigerant channels 36 extend through at least freezing block 20 spaced closely adjacent and parallel to barrel 30 for chilling freezing block 20 and parallel to the axes of rotation of screws 14 and 16 and positioned at a distance relative to each other. Specifically, the temperature at the inner mantle surface of barrel 30 should be in the order of −8° F. (−22° C.) and in the preferred form in the range of −20° to +4° F. (−29° to −15° C.), particularly in the range of −15° to −1° F. (−26° to −18° C.), and in the most preferred form in the range of −9° to −7° F. (−22° to −21.6° C.). Inlet block 26 and exit plate 28 can either be directly chilled or not depending upon the requirements of the liquid being processed. In the most preferred form, channels 36 are located exclusively in freezing block 20 to allow removal of inlet block 26 and exit plate 28 from freezing block 20 for cleaning without requiring the source of refrigerant or coolant from being disconnected and specifically from being disconnected from freezing block 20.

In the most preferred form, first and second rows of channels 36 are provided parallel to but at different radial spacings from barrel 30. In this arrangement, the first row of channels 36 is provided for rapid temperature response to minimize recovery time and the second row of channels 36 is provided for increasing the total amount of heat transfer in housing assembly 18. As diagrammatically illustrated in FIG. 4, freezing block 20 is formed of upstream, intermediate, and downstream portions 20a, 20b, and 20c which are integrally secured together. An inlet port 82 is formed in upstream portion 20a and intersects with a plennum which is in simultaneous fluid communication with the upstream ends of each of the channels 36 in the first row. Downstream portion 20c includes a plennum which is in simultaneous fluid communication with the downstream ends of each of the channels 36 of the first and second rows. An exit port 84 is also formed in upstream portion 20a and intersects with a plennum which is in simultaneous fluid communication with the upstream ends of each of the channels 36 in the second row.

In preferred applications, assembly 18 is made of a highly thermally conductive material such as aluminum or an aluminum alloy. In other applications, assembly 18 may be made of carbon, alloy steel, or other materials. In addition, plated or coated materials could be used. Assembly 18 is designed to minimize the thermal mass and maximize the thermal response of the refrigeration system to enable close control over the inner wall temperatures of barrel 30. Since convective heat transfer between the refrigerant and cooling channels 36 is the limiting factor in removing heat, the number of channels 36 should be maximized based upon geometric and structural constraints. Generally, in the preferred form, minimizing thermal mass entails minimal wall sections between barrel 30 and channels 36 and between channels 36 themselves while maintaining structural integrity and in the most preferred form the distance between barrel 30 and channels 36 and between channels 36 is approximately ⅛ inch (0.32 cm) and in the preferred form in the range of 1 to 5 millimeters. This represents a significant reduction in thickness from typical housings for continuous process twin screw extruders. One reason this is possible is that the process-of apparatus 10 of the present invention operates at near atmospheric pressure conditions and the need for thick wall construction due to high pressure operation is reduced considerably. The thin wall section separating cooling channels 36 from barrel 30 offers little thermal conduction resistance. This allows the refrigeration system to change the wall temperature of barrel 30 rapidly in response to a possible increase in wall temperature due to the introduction of a relatively warmer food product. The rapid response allows apparatus 10 of the present invention to operate on a batch mode basis. In other words, freezing block 20 can be emptied out and then refilled with product at a later time without ever getting either too cold when empty, or too warm with the fresh introduction of relatively warmer product.

However, it can be appreciated that other provisions can be utilized according to the teachings of the present invention for chilling block 20 other than through the use of circulating refrigerant or coolant through channels 36 including but not limited to flooding block 20 with a refrigerant or coolant.

Figure 2:
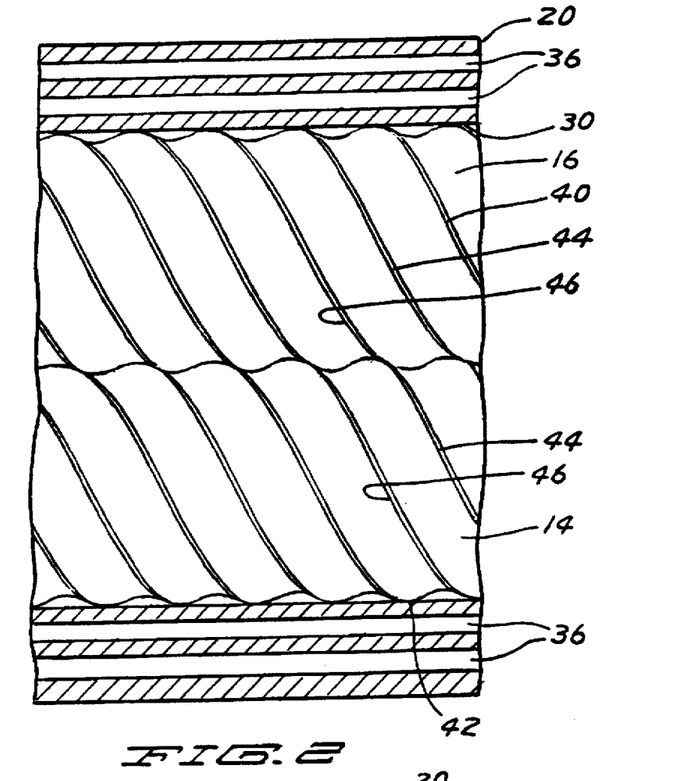
FIG. 2 shows a cross-sectional view of the apparatus of FIG. 1 according to section line 2—2 of FIG. 1.
Figure 3A:
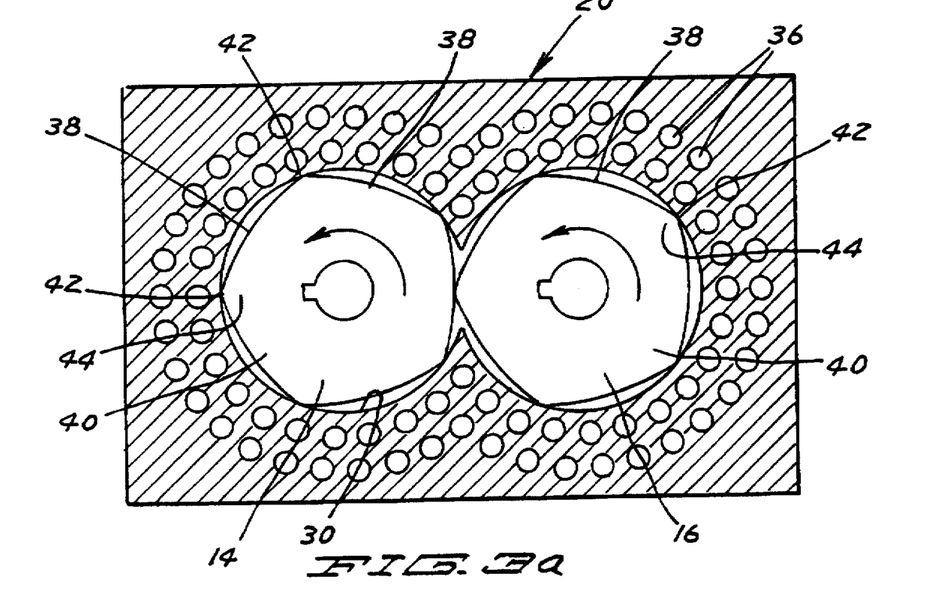
FIGS. 3a, 3b, 3c, 3d and 3e show cross-sectional views of the apparatus of FIG. 1 according to section line 3—3 of FIG. 1 in 9° intervals of rotation.
Figure 3B:
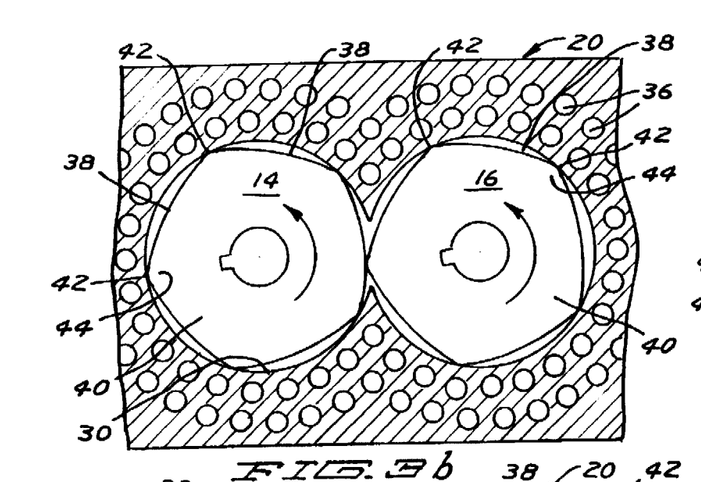
Figure 3C:
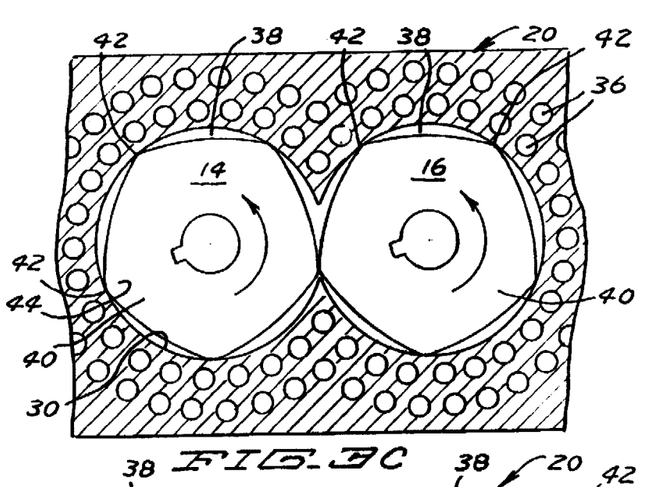
Figure 3D:
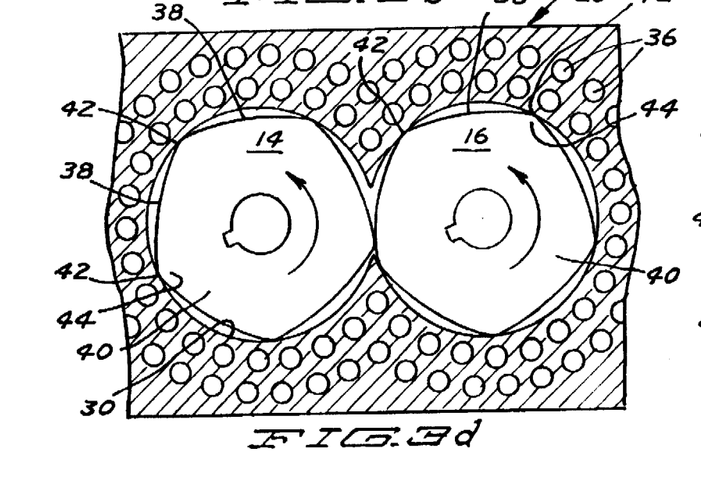
Figure 3E:
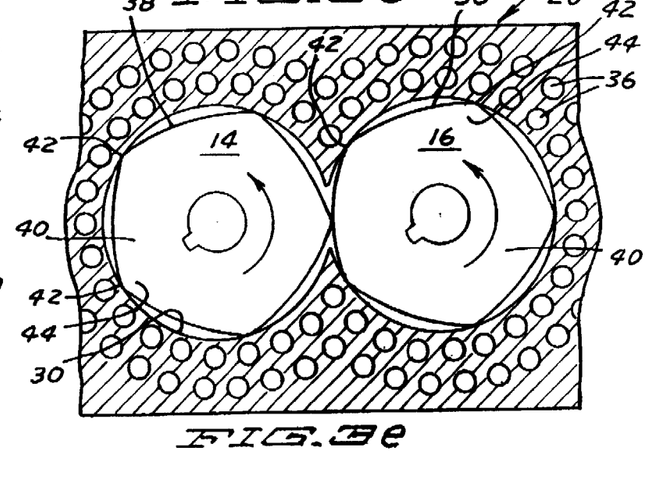

As best seen in FIGS. 2 and 3, screws 14 and 16 are of identical construction and phased to allow intermeshing. Generally, screws 14 and 16 each include a shaft cylinder with a mantle surface or root 38 having an outer periphery generally concentric to the axis of rotation and having a constant diameter along the entire axial length. Screws 14 and 16 each further include a flight 40 disposed on root 38 and having a pitch in the order of 1.6 times the diameters and in the preferred form in the range of 0.4 to 2.4 times the diameters, particularly in the range of 1.2 to 2 times the diameters, and in the most preferred form in the order of 1.5 to 1.7 times the diameters. Flight 40 has a crest 42, a leading face 44 and a trailing face 46. In the most preferred form, faces 44 and 46 are not linear and have an increasing size from crest 42 to root 38. The thickness of flight 40 between faces 44 and 46 is much smaller than the axial width of the channel defined by flight 40. Screws 14 and 16 are positioned parallel to each other and further positioned such that the threads of screw 16 formed by flight 40 are located between the threads of screw 14 formed by flight 40. In the preferred form, crest 42 of screw 14 closely sweeps root 38 of screw 16 and crest 42 of screw 16 closely sweeps root 38 of screw 14 with minimal clearance. Additionally, as best seen in FIG. 3, crest 42 of at least one of the screws 14 and 16 is always sweeping the other of the screws 14 and 16 in every rotational position of screws 14 and 16. It should be appreciated that screws 14 and 16 having 5 lobes generally repeat the relative rotation positions every 36° of rotation as best seen when comparing FIGS. 3a and 3e.

In the preferred form and at 70° F. (32.4° C.) of block 20 and screws 14 and 16, a ratio of the radial screw clearance, which is defined as the difference between the radius of barrel 30 and the outside radii of screws 14 and 16 or in other words the spacing between crests 42 of flights 40 of screws 14 and 16 and barrel 30, versus the radius of flights 40 of screws 14 and 16 is in the order of 0.006, and in the preferred form in the range of 0.002 to 0.010, particularly in the range of 0.003 to 0.009 and in the most preferred form in the range of 0.005 to 0.007. Further, as best seen in FIG. 2, faces 44 and 46 in the preferred form are profiled such that face 44 of screw 14 closely sweeps face 46 of screw 16 with minimal clearance at all rotational positions of screws 14 and 16. Specifically, screws 14 and 16 are designed with no clearance between faces 44 and 46, with the clearance between faces 44 and 46 being less than 0.5% of the diameter of screws 14 and 16 and preferably less than 0.25% of the diameter of screws 14 and 16 during operation of apparatus 10 according to the teachings of the present invention.

This close sweep action between screws 14 and 16 provides a self-wiping action preventing the buildup and degradation of material on the surfaces of screws 14 and 16. Similarly, the minimal screw-to-barrel clearance provides a self-wiping action preventing buildup and degradation of material on the wall surfaces of barrel 30. Buildup and degradation of material can result in product contamination and unstable conditions. Flights 40 can be fabricated to have generally anywhere from one to six lobes with five lobes being shown in FIG. 3.

In the most preferred form, screws 14 and 16 are rotated by a suitable drive 47 to both rotate in the same direction, in other words co-rotating, at a speed in the order of 100 RPM and in the preferred form in the range of 60 to 140 RPM, particularly in the range of 80 to 120 RPM, and in the most preferred form in the range of 90 to 110 RPM. Co-rotating screws 14 and 16 are advantageous. Specifically, problems of calendering which can occur with screws rotating in opposite directions, in other words, counter-rotating screws, are avoided. Particularly, product in the gap between counter-rotating screws tend to force apart the screws such that product can remain in the barrel intermediate the screws. Further, such forces also put pressure between the crests of the flights and the barrel causing excess wear of the flights and resulting in heat generation.

Figure 4:
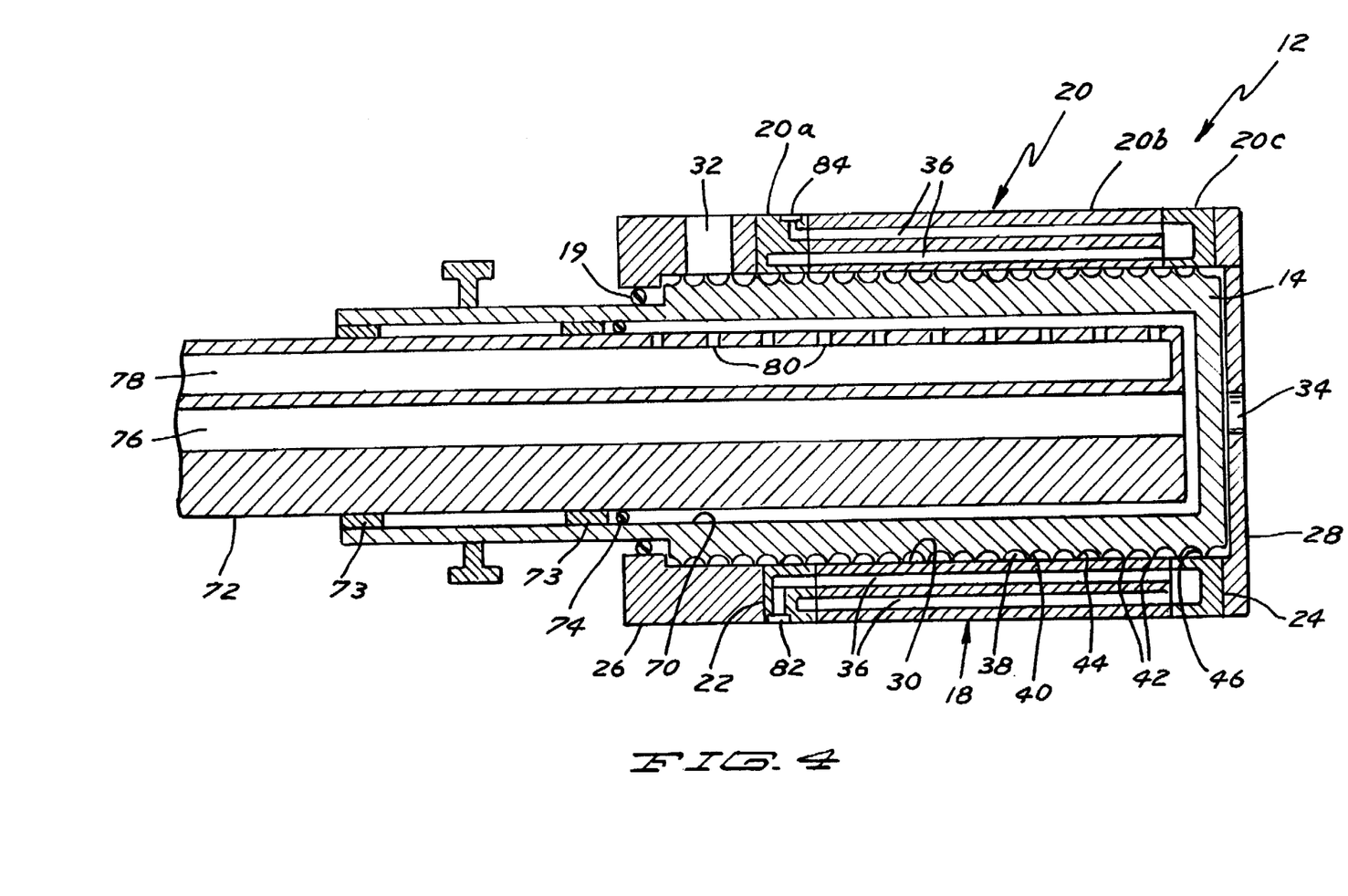
FIG. 4 shows a diagrammatic, cross-sectional view of an alternate embodiment of a chilled screw extruder for the apparatus of FIG. 1.

In another embodiment of the present invention, one or both screws 14 and 16 are provided with inner cooling in addition to the cooling of housing assembly 18. In the form as shown in FIG. 4, roots 38 of each screw 14 and 16 are substantially hollow and specifically include a cylindrical bore 70 extending axially from the axial, upstream, driven end towards but axially spaced from the axial, downstream end of screws 14 and 16. Each of the screws 14 and 16 further includes a cylindrical stationary post 72 having a diameter slightly smaller than the diameter of bore 70 and an axial length greater than that of bore 70. Post 72 is positioned such that its axially free end is located closely adjacent to the axially inner end of bore 70, with screws 14 and 16 being rotatable about posts 72 such as by being rotatably supported on posts 72 by bearings 73. Suitable seals 74 are provided between bores 70 and posts 72. Screws 14 and 16 can be rotated relative to posts 72 and housing assembly 18 such as by sprockets secured to screws 14 and 16 and positioned axially outward of housing assembly 18.

Each post 72 includes at least one inlet conduit 76 extending axially from the axially free end of post 72 and is suitably connected to a source of refrigerant or coolant. Each post 72 further includes at least one return conduit 78 extending from a point axially spaced outward of the axially free end of post 72 and suitably connected to the source of refrigerant or coolant. Each return conduit 78 includes a plurality of apertures 80 extending between the cylindrical outer face of post 72 and conduit 78, with apertures 80 being spaced in an axial direction along the axial extent of post 72 located inside seal 74 and bore 70.

In operation, low temperature refrigerant or coolant travels from the source through inlet conduit 76 of post 72 into the interior of screws 14 and 16 and specifically inside of bores 70. The refrigerant or coolant travels from the volume between the axially free end of post 72 and the axially inner end of bore 70 to the volume between the cylindrical faces of bore 70 and post 72. The refrigerant and coolant then travels through apertures 80 into conduit 78 back to the source. It should be appreciated that apertures 80 are sized such that some refrigerant and coolant must travel the full axial length of bore 72 inside of seal 74 to insure cooling the full axial length of screws 14 and 16. Freezing of the liquid on the surfaces of screws 14 and 16 in addition to the surface of barrel 30 can then occur, and to insure dynamic freezing, constant self wiping of and between screws 14 and 16 is required.

Co-rotating twin screws 14 and 16 according to the teachings of the present invention have a distinct advantage over simple single augers such as taught in U.S. Pat. No. 3,803,870. Specifically, through the action of dual rotation, the product passes from one screw to another as it is also being scraped and transported along the axes of screws 14 and 16. This action yields a significantly higher mass transfer of the product along the inner wall of barrel 30. One of the factors in extracting heat, among other things, is the mass transfer of the liquid being chilled. By maximizing the mass transfer, the heat transfer can also be maximized which in turn reduces the amount of time that the product must necessarily be in contact with the chilled surface which would reduce the overall size necessary for the chilled surface. So increasing the rate of heat removal yields the double benefit of reduced product residence time in the freezing chamber and smaller freezing chamber size.

Additionally, co-rotating twin screws 14 and 16 according to the present invention employ a ratio between the radius of flight 40 at crest 42 to the radius at root 38 in the order of 1.04 and in the preferred form in the range of 1.01 to 1.2, particularly in the range of 1.02 to 1.07, and in the most preferred form in the range of 1.03 to 1.05. This is not a typical design for twin screw extruders which normally have a ratio in the order of 1.5 to 2, with extruders for plastic for compounding purposes being in the low range, extruders for continuous mixing of doughs being in the high range, and cooking extruders for expanded products such as for pet foods and snacks being in intermediate ranges.

Screws 14 and 16 according to the teachings of the present invention reduce the total amount of product in the screw chamber at any given time while at the same time further decreasing the residence time necessary in assembly 18 by increasing the specific heat transfer (heat extracted per second per ounce of product). The ratio of the free volume of product in the screw chamber to the chilled surface area of barrel 30 is much lower than with typical twin screw applications to take advantage of exposing the product to a relatively large chilled surface area. This ratio can be further greatly reduced if screws 14 and 16 are themselves chilled and are included in the chilled surface area calculation. Both of these ratios help quantify the ability of extruder 12 according to the preferred teachings of the present invention to rapidly remove heat from the liquid product.

When compared to counter-rotating screws or single screw systems, the amount of heat added to extruder 12 through friction between screws 14 and 16 and the wall surface of barrel 30 and through the energy dissipation into the product has been minimized through the use of co-rotating twin screws 14 and 16 with carefully selected geometric dimensions.

Figure 1:
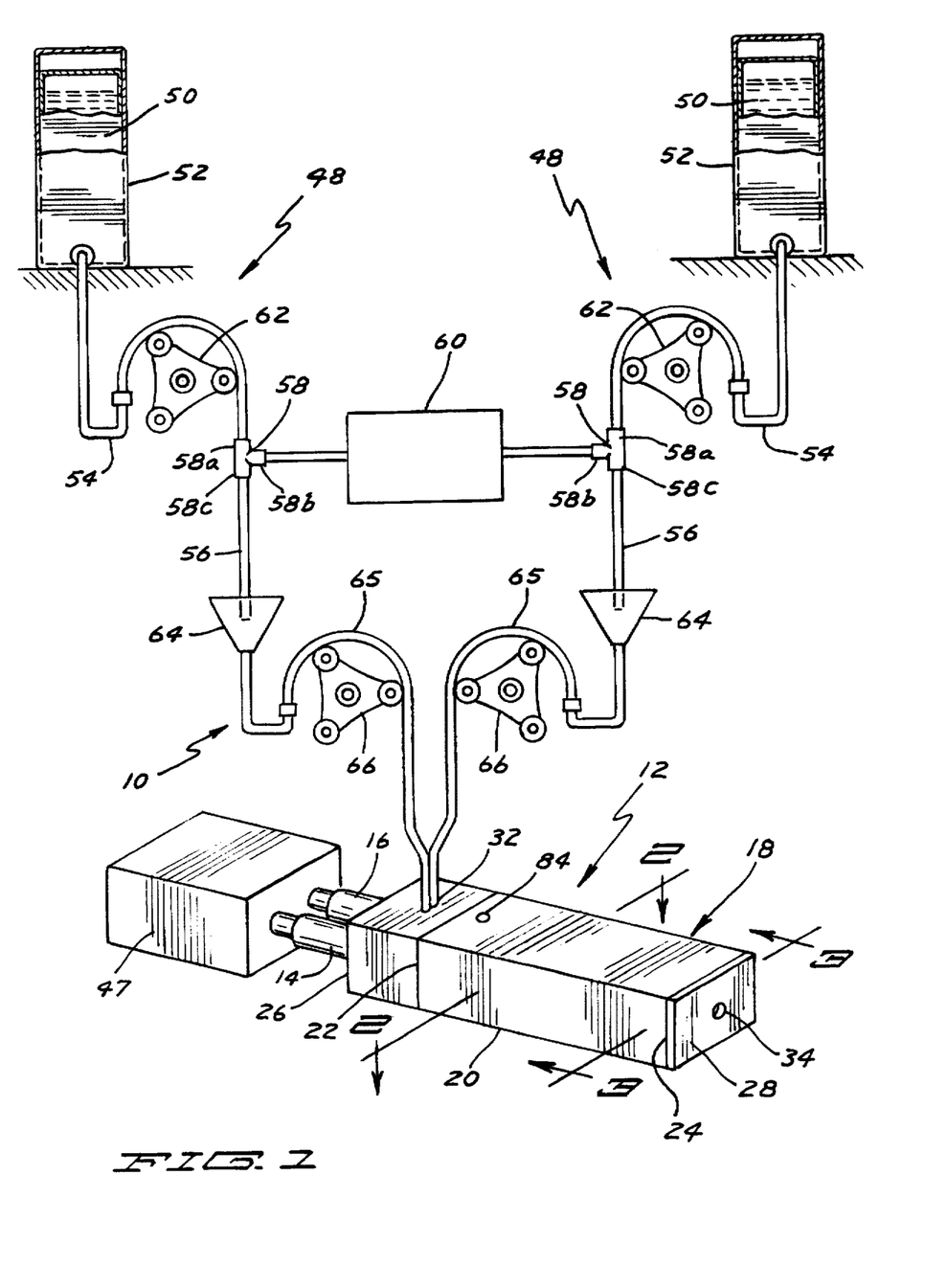
FIG. 1 shows a diagrammatic view of an apparatus utilizing methods for at least partially freezing of an aerated food product in a batch mode according to the preferred teachings of the present invention.

According to the preferred teachings of the present invention, extruder 12 is utilized and has special application to dynamically freeze an aerated liquid and in particular to produce an aerated frozen product such as frozen ice cream, frozen yogurt, semi-frozen shakes, and the like. In particular, one or more sources 48 of a properly aerated liquid is in fluid communication with entrance port 32 of assembly 18 of extruder 12, with two sources 48 being shown. In the most preferred form, each source 48 includes a plastic bag 50 of at least a partly liquid food product such as an ice cream base, with the product being held at atmospheric pressure. In the most preferred form, bag 50 is located in a carton 52 such as formed of cardboard. A length of flexible tubing 54 is in fluid communication with bag 50 such as by suitable fixtures. For achieving aeration, a turbulence tube 56 is utilized of the type of U.S. Pat. Nos. 5,292,030; 5,433,967; and 5,473,909. In particular, a T-fitting 58 is provided having a first leg 58a connected to the downstream end of tubing 54, a second leg 58b connected to a source 60 of air or other gas-under pressure, and a third leg 58c connected to the upstream end of turbulence tube 56. The liquid food product within bag 50 is pumped or otherwise forced through tubing 54 into fitting 58 such as by a conventional peristaltic pump 62 which engages and compresses tubing 54. As set forth in U.S. Pat. Nos. 5,292,030; 5,433,967; and 5,473,909, the air and liquid food product are mixed together and forced along turbulence tube 56 so that by the time the liquid leaves turbulence tube 56, the liquid food product is properly aerated to the proper overrun level.

When utilizing turbulence tube 56, it is necessary to remove excess air that does not get incorporated into the liquid food product but acts only to transport the liquid food product and aerated liquid through turbulence tube 56 before the aerated frozen product leaves extruder 12 through exit port 34. In a preferred form, turbulence tube 56 delivers the aerated liquid and excess air to a collection vessel 64 which is open to atmosphere allowing the excess air to escape therefrom. A length of flexible tubing 65 is in fluid communication between vessel 64 and entrance port 32. The aerated liquid product within vessel 64 is pumped or otherwise forced through tubing 65 into entrance port 32 such as by a conventional peristaltic pump 66 which engages and compresses tubing 65. In the preferred form, the aerated liquid product is forced into entrance port 32 of extruder 12 under a pressure greater than atmospheric pressure and in the most preferred form at a pressure in the order of 40 psi (2.8 bars) by pump 66. It has been found that when aerated liquid is force fed into extruder 12, feed rates of 150% to 300% are obtained as compared to when aerated liquids are simply fed by gravity at atmospheric pressures into extruder 12. It should be appreciated that other manners of removing excess air and for force feeding the aerated liquid can be utilized. For example, turbulence tube 56 could deliver the aerated liquid and excess air directly into entrance port 32 and assembly 18 could include suitable provisions for venting the excess air from extruder 12 separate from exit port 34. Also, turbulence tube 56 could deliver the aerated liquid and excess air to a small plenum in communication with entrance port 32 of extruder 12. This small plenum could include a relief valve to maintain a positive gage pressure inside of the small plenum to pressurize the aerated liquid as it flows through entrance port 32 and into extruder 12.

In the most preferred form of the present invention, source 48 utilizes turbulence tube 56 for aeration and is believed to be advantageous at least due to its simplicity and ease of sanitation. There are, however, other manners of providing a properly aerated product to extruder 12 such as but not limited to high speed mixers. Additionally, although in the preferred form a two-step process is utilized where the liquid product is aerated before its introduction into extruder 12, other methods of the dynamic freezing of an aerated liquid product can be utilized including but not limited to where air under pressure is introduced with the liquid product directly into extruder 12 where aeration and dynamic freezing are accomplished simultaneously.

The improved heat transfer rate in combination with the reduced amount of product at any given time inside barrel 30 allows extruder 12 according to the teachings of the present invention to freeze up to two ounces per second of aerated product. The time necessary from activating the filling and freezing process up to the start of product exiting exit port 34 is less than seven seconds and preferably less than four seconds. This is a substantial improvement over prior art reservoir type freezing which normally requires a ninety second recovery time.

The reduced free volume of product in the screw chamber also allows the operation of extruder 12 according to the teachings of the present invention in a non-continuous, batch mode for dispensing individual fresh servings on demand. In particular, the product to be at least partially frozen is supplied to extruder 12 by source 48 in discrete volumes corresponding to the volume of frozen product desired to be dispensed. Screws 14 and 16 are rotated sufficiently between the supply of discrete volumes such that the frozen product of one volume has substantially passed through exit port 34 before the next discrete volume of product to be frozen is supplied to extruder 12. Prior implementations of twin screw devices universally are run in a continuous mode. Running in a batch mode, co-rotating twin screws 14 and 16, according to this invention, clean themselves out and leave very little product remaining on the screw surfaces. This maximizes the freshness and the purity of the product regardless of the frequency of product dispensing.

It should further be realized that freezing block 20 in the most preferred form of the present invention is particularly advantageous in allowing operation in a non-continuous, batch mode. Specifically, the product to be at least partially frozen might be introduced into port 32 at a temperature 50° F. (28° C.) greater than the desired surface temperature of barrel 30 and in response the surface temperature of barrel 30 may increase approximately by 5° F. (2.8° C.). A need then exists for the batch mode operation of apparatus 10 of the present invention to rapidly and specifically in approximately 1 second or less reduce the surface temperature of barrel 30 to the desired temperature and without allowing the surface temperature to get too cold, such as below approximately −20° F. (−29° C.).

Specifically, in the preferred form of the present invention, minimal wall sections are provided between barrel 30 and channels 36. Particularly, in the most preferred form for the dynamic freezing of aerated products, the thickness of the wall sections between barrel 30 and channels 36 and between channels 36 themselves is in the range of 1 to 5 millimeters and preferably approximately 0.125 inch (0.318 cm) which is about one eighth of the thickness for typical housings for continuous process twin screw extruders having similar diameter screws. It should be realized that there is no need for a rapid (less than one second) temperature response in a continuous process twin screw extruder as conditions inside of the housing are not expected to change by more than about 5 percent from their setpoint over time. Additionally, typical twin screw extruders are constructed to withstand internal pressures of up to 2500 psi (175 bars) without yielding or failure of the wall sections. Operation of apparatus 10 according to the preferred teachings of the present invention at near atmospheric conditions and specifically at approximately 50 psi (3.5 bars) reduces the need for thick wall construction by a factor of approximately 50. The thickness of the wall sections between barrel 30 and channels 36 is directly proportional to the conductive thermal resistance for a given material and cross-sectional area. The heat transfer is inversely proportional to both the thickness and thermal resistance for a given material and cross-sectional area. Increasing the thermal resistance, for example by increasing the thickness of the wall sections, results in a decrease in heat transfer. A reduction in heat transfer results in a proportional increase in the time required for the refrigerant or coolant to force the wall temperature of barrel 30 into the desired range after the introduction of product into barrel 30 at greater temperature than the desired wall temperature. It can be appreciated that by substantially reducing the wall section thickness, a substantially lower thermal resistance results. Thus, by minimizing wall section thickness, the recovery time is also minimized to allow operation on a batch mode basis according to the teachings of the present invention.

In the most preferred form, one or more flavors can be selectively added-. Such addition can take place prior to turbulence tube 56, within turbulence tube 56, at entrance port 32 of extruder 12, in extruder 12 intermediate ports 32 and 34 or after exit port 34. Addition of flavors after exit port 34 provides the least flavor carryover between individual servings of frozen food product and may yield greater aromatics and flavor to the consumer.

According to the teachings of the present invention, apparatus 10 is able to dynamically and at least partially freeze an aerated food product while maintaining the desired aeration level or overrun. Further, as apparatus 10 operates on a batch rather than a continuous process, each frozen food product is produced on demand to maximize freshness independent of the frequency that servings of frozen food product are dispensed. Furthermore, due to the minimization of carryover between the production of individual servings, apparatus 10 according to the teachings of the present invention can include multiple sources 48 of partial liquid food product as well as multiple flavors. As an example, three different sources 48 could be provided such as a no fat, a low fat, and a regular fat content base and eight different flavors could be added so that a total of 24 different frozen food products could be produced from a single apparatus 10. Also, as each frozen food product is produced on demand, if and when apparatus 10 goes through a cleaning cycle, it is not necessary to discard any product contained in bag 50 and/or flavors. Further, the volume of food product forced from bag 50 into entrance port 32 can be adjusted according to the volume desired of the individual serving. Furthermore, the volume of food product can be controlled automatically to insure that the size of the individual servings are consistent.

Now that the basic teachings of the present invention have been explained, many extensions and variations will be obvious to one having ordinary skill in the art. For example, although having particular application to the freezing and extrusion of frozen ice creams, frozen yogurts, or semi-frozen shakes, apparatus 10 according to the teachings of the present invention could be used for cooling and at least partially freezing any particular product which is at least partly liquid including aerated and nonaerated beverages and non-food products. The amount of water in the partially liquid product could range from zero to one hundred percent.

Further, in the most preferred form, apparatus 10 according to the preferred teachings of the present invention has been disclosed for the dynamic freezing of an individual serving which will typically range in size between 2 to 16 fluid ounces (60 to 470 cubic centimeters) and is believed to have particular advantageous application thereto. However, it can be appreciated that an individual serving can also range from between a dollop on top of a desert prepared by another process to a cake or family sized amount intended to be consumed by several people and/or not to be consumed by a single individual in one sitting. However, in any case, it should be appreciated that in the preferred form, each individual serving of whatever size is separately dynamically frozen from each other in a noncontinuous, batch mode.

Likewise, although producing a series of multiple individual servings of a food product in a batch mode is believed to be particularly advantageous, apparatus 10 could be utilized in a continuous mode according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Device for at least partially freezing a food product which is at least partly liquid comprising, in combination: first and second substantially intermeshing screws, with each of the screws including a root having an outer periphery and a flight disposed on the root, with each flight having a crest, a leading face, and a trailing face; a housing assembly including a barrel, an entrance port in fluid communication with the barrel, and an exit port in fluid communication with the barrel, with the barrel having a figure 8-shape for rotatably receiving the first and second screws and having a configuration and size providing minimal clearance between the crests of the flights and the barrel, with the crest of the flight of the first screw closely sweeping the root of the second screw and the crest of the flight of the second screw closely sweeping the root of the first screw and with the leading face of the flight of the first screw closely sweeping the trailing face of the flight of the second screw so that the first and second screws are self-wiping; means for simultaneously co-rotating the first and second screws received within the barrel; means for supplying the product into the entrance port; and means for chilling the barrel for freezing the product on the barrel for being continually scraped therefrom by the crests of the flights of the first and second screws while the product is being conveyed from the entrance port to the exit port by the rotation of the first and second screws with the product being at least partially frozen before passing through the exit port.

2. The device of claim 1 wherein the supplying means comprises, in combination: means for supplying the product into the entrance port in multiple, discrete volumes, with the simultaneously rotating means rotating the screws sufficiently between the volumes such that the at least partially frozen product of one volume has substantially passed through the exit port without carryover before the next volume of the product is fed such that the device delivers product in a noncontinuous, batch mode.

3. The device of claim 2 wherein the supplying means comprises means for supplying the product in the form of an aerated food product.

4. The device of claim 3 wherein the supply means comprises means for forcing the aerated food product into the entrance port at greater than atmospheric pressure.

5. The device of claim 4 wherein the forcing means comprises means for pumping the aerated food product into the entrance port.

6. The device of claim 5 wherein the ratio of the radius of the flight at the crest to the radius at the root is in the range of 1.01 to 1.2.

7. The device of claim 6 wherein a ratio of the clearance between the crests of the flights and the barrel and the radius of the flights of the screws is in the range of 0.002 to 0.010.

8. The device of claim 6 wherein the ratio of the length of the barrel to the outside diameter of the flights of the screws is in the range of 1.5 to 6.0.

9. The device of claim 8 wherein the flights of the screws have a pitch in the range of 0.4 to 2.4 times the diameters.

10. The device of claim 1 wherein the screws are positioned parallel to each other.

11. The device of claim 1 wherein the faces of the flights of the screws are not linear and have an increasing size from the crests to the roots.

12. The device of claim 1 wherein the chilling means comprises multiple refrigerant channels extending through the housing assembly spaced closely adjacent and parallel to the barrel, with the housing assembly made of highly thermally conductive material.

13. The device of claim 12 wherein the refrigerant channels are spaced in the range of 1 to 5 millimeters from the barrel and the refrigerant channels are spaced in the range of 1 to 5 millimeters from each other.

14. The device of claim 12 wherein the refrigerant channels extend through the housing assembly in first and second rows, with the second row having greater radial spacing from the barrel than the first row.

15. Device for at least partially freezing a food product which is at least partly liquid comprising, in combination: first and second substantially intermeshing screws, with each of the screws including a root having an outer periphery and a flight disposed on the root, with each flight having a crest, a leading face, and a trailing face; a housing assembly including a barrel, an entrance port in fluid communication with the barrel, and an exit port in fluid communication with the barrel, with the barrel having a figure 8-shape for rotatably receiving the first and second screws and having a configuration and size providing minimal clearance between the crests of the flights and the barrel, with the crest of the flight of the first screw closely sweeping the root of the second screw and the crest of the flight of the second screw closely sweeping the root of the first screw and with the leading face of the flight of the first screw closely sweeping the trailing face of the flight of the second screw so that the first and second screws are self-wiping; means for simultaneously rotating the first and second screws received within the barrel; means for supplying the product into the entrance port; means for chilling the barrel for freezing the product on the barrel for being continually scraped therefrom by the crests of the flights of the first and second screws while the product is being conveyed from the entrance port to the exit port by the rotation of the first and second screws with the product being at least partially frozen before passing through the exit port; and means for chilling the first and second screws for freezing the product on the leading and trailing faces and the roots of the first and second screws for being continually scraped therefrom by the flights of the first and second screws.

16. The device of claim 15 wherein each of the screws comprises, in combination: first and second axial ends; and wherein the screw chilling means comprises, in combination: a cylindrical bore extending axially from the first axial end towards but axially spaced from the second axial end; a cylindrical post having a diameter slightly smaller than the diameter of the cylindrical bore and received in the cylindrical bore; and means for passing a refrigerant or coolant between the cylindrical post and the cylindrical bore.

17. The device of claim 16 wherein the passing means comprises, in combination: an inlet conduit, with the cylindrical post having a cylindrical outer face and an axial free end located within the cylindrical bore, with the inlet conduit extending axially from the axial free end of the cylindrical post; a return conduit formed in the cylindrical post and extending from a point axially spaced from the axial free end of the cylindrical post; and apertures extending from the cylindrical outer face and intersecting with the return conduit.

18. Device for at least partially freezing a food product which is at least partly liquid comprising, in combination: first and second substantially intermeshing screws, with each of the screws including a root having an outer periphery and a flight disposed on the root, with each flight having a crest, a leading face, and a trailing face; a housing assembly including a barrel, an entrance port in fluid communication with the barrel, and an exit port in fluid communication with the barrel, with the barrel having a figure 8-shape for rotatably receiving the first and second screws and having a configuration and size providing minimal clearance between the crests of the flights and the barrel, with the crest of the flight of the first screw closely sweeping the root of the second screw and the crest of the flight of the second screw closely sweeping the root of the first screw and with the leading face of the flight of the first screw closely sweeping the trailing face of the flight of the second screw so that the first and second screws are self-wiping; means for simultaneously rotating the first and second screws received within the barrel; means for supplying the product into the entrance port; and means for chilling the barrel for freezing the product on the barrel for being continually scraped therefrom by the crests of the flights of the first and second screws while the product is being conveyed from the entrance port to the exit port by the rotation of the first and second screws with the product being at least partially frozen before passing through the exit port; wherein the chilling means comprises at least one refrigerant channel extending through the housing assembly; and wherein the housing assembly comprises, in combination: a freezing block having an upstream end and a downstream end; an inlet block removably secured to and covering the upstream end, with the inlet block including the entrance port; and an exit plate removably secured to and covering the downstream end, with the exit plate including the exit port, with the barrel extending from the downstream end to the upstream end, with the refrigerant channel located exclusively in the freezing block to allow removal of the inlet block and the exit plate from the freezing block without requiring the refrigerant channel being disconnected from the source of refrigerant.

19. The device of claim 18 wherein multiple refrigerant channels extend through the housing assembly spaced closely adjacent and parallel to the barrel, with the housing assembly made of highly thermally conductive material.

20. Method for producing a series of multiple individual servings of an at least partially frozen food product comprising the steps of: providing a food product which is at least partly liquid; providing a twin screw extruder including first and second intermeshing, screws rotatably received in a figure 8-shaped barrel and having minimal screw clearance; chilling the barrel for freezing the food product on the barrel, with rotation of the first and second screws scraping the frozen food product from the barrel and conveying the food product from an entrance port through an exit port; supplying the food product into the entrance port in discrete volumes; rotating the first and second screws within the figure 8-shaped barrel while the food product is supplied into the entrance port and continuing after the discrete volume of the food product has been supplied to convey the at least partially frozen food product through the exit port; and delaying supplying the next discrete volume of the food product.

21. The method of claim 20 wherein the twin screw extruder providing step comprises the step of providing the twin screw extruder including first and second self-wiping screws; and wherein the delaying step comprises the step of delaying supplying the next discrete volume of the food product until after the first and second screws have been rotated sufficiently to substantially prevent intermixing of the discrete volumes of the food product.

22. The method of claim 21 wherein the food product providing step comprises the step of providing an aerated food product.

23. The method of claim 22 wherein the supplying step comprises the step of pumping the aerated food product into the entrance port at greater than atmospheric pressure.

24. The method of claim 20 further comprising the step of chilling at least one of the first and second screws for freezing the food product on the first and second screws.

25. The method of claim 20 wherein the twin screw extruder providing step comprises the step of providing the twin screw extruder including first and second co-rotating screws.

26. The method of claim 20 wherein the delaying step comprises the step of delaying supplying the next discrete volume of the food product until after the prior discrete volume has been substantially conveyed through the exit port by the rotation of the first and second screws.

* * * * *